(12) United States Patent
Chong (10) Patent No.: US 7,900,247 B2
(45) Date of Patent: Mar. 1, 2011

(54) TRUSTED THIRD PARTY AUTHENTICATION FOR WEB SERVICES

(75) Inventor: Frederick C. Chong, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1153 days.

(21) Appl. No.: 11/079,050

(22) Filed: Mar. 14, 2005

(65) Prior Publication Data
US 2006/0206932 A1   Sep. 14, 2006

(51) Int. Cl.
*H04L 9/32* (2006.01)
(52) U.S. Cl. .............................. 726/10; 726/9; 713/171
(58) Field of Classification Search .................. 726/4, 5, 726/9, 10, 28; 380/259, 279, 281, 282, 284; 713/168, 155
See application file for complete search history.

(56) References Cited

U.S. PATENT DOCUMENTS

| 7,356,694 B2* | 4/2008 | Mayo et al. ................... 713/159 |
| 2003/0149871 A1* | 8/2003 | Medvinsky ................... 713/155 |
| 2003/0149880 A1* | 8/2003 | Shamsaasef et al. ......... 713/182 |
| 2004/0139319 A1* | 7/2004 | Favazza et al. ............... 713/168 |
| 2004/0220878 A1 | 11/2004 | Lao et al. ........................ 705/51 |

OTHER PUBLICATIONS

Atkinson et al., Web services Security, Apr. 5, 2002, Version 1.0, pp. 10-12.*
McMahon, P.V., "SESAME V2 Public Key and Authorisation Extensions to Kerberos", Network and Distributed System Security, Proceedings of the SYM Posium in San Diego, California, Feb. 16-17, 1995.
Neuman, Clifford B., et al., "Kerberos: An Authentication Service for Computer Networks", IEEE Communications Magazine, IEEE Service Center, Piscataway, US, vol. 32, No. 9, Sep. 1, 1994.

* cited by examiner

*Primary Examiner* — Jung Kim
*Assistant Examiner* — Izunna Okeke
(74) *Attorney, Agent, or Firm* — Workman Nydegger (57) ABSTRACT

The present invention extends to trusted third party authentication for Web services. Web services trust and delegate user authentication responsibility to a trusted third party that acts as an identity provider for the trusting Web services. The trusted third party authenticates users through common authentication mechanisms, such as, for example, username/password and X.509 certificates and uses initial user authentication to bootstrap subsequent secure sessions with Web services. Web services construct user identity context using a service session token issued by the trusted third party and reconstruct security states without having to use a service-side distributed cache.

15 Claims, 6 Drawing Sheets

TRUSTED THIRD PARTY AUTHENTICATION FOR WEB SERVICES

CROSS-REFERENCE TO RELATED APPLICATIONS

Not applicable.

BACKGROUND OF THE INVENTION

1. The Field of the Invention

The present invention relates to computerized authentication and, more particularly, to trusted third party authentication for Web services.

2. Background and Relevant Art

Computer systems and related technology affect many aspects of society. Indeed, the computer system's ability to process information has transformed the way we live and work. For example, computer systems typically include software applications for performing a host of tasks (e.g., word processing, scheduling, and database management) that prior to the advent of the computer system were performed manually. A computer system can also include maintenance, diagnostic, and security applications (e.g., backup applications, health checkers, anti-virus applications, firewalls, etc.) that help to insure that the computer system remains, or can be returned to, an appropriate operating state. For example, an anti-virus application can detect and eliminate computer viruses before any harm is done to the computer system.

Many computer systems are also typically coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, Web browsing, and printing documents) include the exchange of electronic messages between a number of computer systems and/or other electronic devices via wired and/or wireless computer networks.

Networks have in fact become so prolific that a simple network-enabled computer system may communicate with any one of millions of other computing systems spread throughout the globe over a conglomeration of networks often referred to as the "Internet". Such computing systems may include desktop, laptop, or tablet personal computers; Personal Digital Assistants (PDAs); telephones; or any other computer or device capable of communicating over a digital network.

Further, application functionality can be spread or "distributed" across a number of different networked computer systems. That is, a first portion of an application can reside at a first computer system, a second portion of the application can reside at a second computer system, etc., that are all connected to a common network. These types of applications are commonly referred to as "distributed applications." Distributed applications are particularly prevalent on the World Wide Web ("the Web").

To promote interoperability across different platforms, distributed applications on the Web are often developed in accordance with one or more industry specifications. In particular, Web services describes a standardized way of integrating Web-based applications using the eXtensible Markup Language ("XML"), Simple Object Access Protocol ("SOAP"), Web Services Description Language ("WSDL"), and Universal Description, Discovery and Integration ("UDDI") open standards over the Internet. XML is used to tag the data, SOAP is used to transfer the data, WSDL is used for describing the services available and UDDI is used for listing what services are available.

Often used as a means for businesses to communicate with each other and with clients, Web services allow organizations to communicate data without intimate knowledge of each other's IT systems. Web services share business logic, data and processes through a programmatic interface across a network. Web services allow different applications from different sources to communicate with each other without time-consuming custom coding, and because communication is in XML, Web services are not tied to any one operating system or programming language.

However, since Web services communicate with one another over, often public, networks, there are security risks associated with transferring data between Web services. For example, malicious users can attempt to intercept Web services data as the data is transferred across a network and can implement programs that impersonate the identity of one Web service in an attempt to have other Web services send Web services data to the impersonating programs. Accordingly, a number of Web Services specifications, such as, for example, WS-security, WS-SecureConversation, and WS-Trust, provide building blocks for addressing some of these security issues, such as, for example, signing and encrypting SOAP messages and requesting and receiving security tokens.

However, Web services specifications do not constitute an end-to-end security protocol that Web services can rely on to meet all of their security requirements. That is, there is no prescriptive way that describes how different Web service specifications can be used together to enable common application security requirements. For example, there are limited, if any, mechanisms that allow a group of Web services to trust and delegate user authentication responsibility to a trusted third party that acts as an identity provider for the trusting Web services. Further, there are limited, if any, mechanisms that allow a trusted third party to authenticate users through common authentication mechanisms, such as, for example, username/password and X.509 certificates and use initial user authentication to bootstrap subsequent secure sessions with Web services. Additionally, there are limited, if any, mechanisms that allow Web services to construct user identity context using a service session token issued by a trusted third party and to reconstruct security states without having to use a service-side distributed cache.

Therefore systems, methods, and computer program products that facilitate trusted third party authentication for Web services would be advantageous.

BRIEF SUMMARY OF THE INVENTION

The foregoing problems with the prior state of the art are overcome by the principles of the present invention, which are directed towards methods, systems, and computer program products for trusted third party authentication for Web services. A Web services component sends an authentication request to an authentication service. The authentication service receives the request and validates authentication data contained in the authentication request.

The authentication service sends an authentication response to the Web services component. The authentication response includes two instances of a first symmetric session key for securing communication between the Web services component and an access granting service. The first instance of the session key is included in a first proof token and secured for delivery to the Web services client. The second instance of the session key is included in a token granting token and encrypted with a secret symmetric key of a security token service.

The Web services component receives the authentication response. The Web services component sends an access request, which includes the token granting token, for access to a Web service to the access granting service. The access granting service receives the access request and verifies that the Web service component has an authenticated session to the security token service based on the contents of the token granting token.

The access granting service sends an access granting response to the Web service component. The access granting response includes two instances of a second symmetric session key for securing communication between the Web services component and the Web service. The first instance of the second symmetric session key is encrypted with the first symmetric session key and included in a second proof token. The second instance of the second symmetric session key being encrypted with a public key from a public/private key pair corresponding to the Web service and included in a service token.

The Web services component receives the access granting response. The Web services component sends a security token request, which includes identity information for the Web service component and the service token, to the Web service. The Web service receives the security token request and uses the corresponding private key of the public/private key to decrypt the second instance of the second symmetric session key included in the service token. The Web service authorizes the Web service component to access the Web service based on the contents of the service token.

The Web service generates a master symmetric session key for securing communication between the Web services client and the Web service. The Web service encrypts the master symmetric session key using the second symmetric session key to generate an encrypted master symmetric session key. The Web service includes the encrypted master symmetric session key along with a security context token in a security token response. The Web service sends the security token response to the Web services component such that communication between the Web services component and the Web service can be secured using derived symmetric session keys derived from the master symmetric session key. The Web services component receives the security token response and uses the second symmetric session key to decrypt the master symmetric session key.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The foregoing problems with the prior state of the art are overcome by the principles of the present invention, which are directed towards methods, systems, and computer program products for trusted third party authentication of Web services. A Web services component sends an authentication request to an authentication service. The authentication service receives the request and validates authentication data contained in the authentication request.

The authentication service sends an authentication response to the Web services component. The authentication response includes two instances of a first symmetric session key for securing communication between the Web services component and an access granting service. The first instance of the session key is included in a first proof token and secured for delivery to the Web services client. The second instance of the session key is included in a token granting token and encrypted with a secret symmetric key of a security token service.

The Web services component receives the authentication response. The Web services component sends an access request, which includes the token granting token, for access to a Web service to the access granting service. The access granting service receives the access request and verifies that the Web service component has an authenticated session to the security token service based on the contents of the token granting token.

The access granting service sends an access granting response to the Web service component. The access granting response includes two instances of a second symmetric session key for securing communication between the Web services component and the Web service. The first instance of the second symmetric session key is encrypted with the first symmetric session key and included in a second proof token. The second instance of the second symmetric session key being encrypted with a public key from a public/private key pair corresponding to the Web service and included in a service token.

The Web services component receives the access granting response. The Web services component sends a security token request, which includes identity information for the Web service component and the service token, to the Web service. The Web service receives the security token request and uses the corresponding private key of the public/private key to decrypt the second instance of the second symmetric session key included in the service token. The Web service authorizes the Web service component to access the Web service based on the contents of the service token.

The Web service generates a master symmetric session key for securing communication between the Web services client and the Web service. The Web service encrypts the master symmetric session key using the second symmetric session key to generate an encrypted master symmetric session key.

The Web service includes the encrypted master symmetric session key along with a security context token in a security token response. The Web service sends the security token response to the Web services component such that communication between the Web services component and the Web service can be secured using derived symmetric session keys derived from the master symmetric session key. The Web services component receives the security token response and uses the second symmetric session key to decrypt the master symmetric session key.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The computer executable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1A:
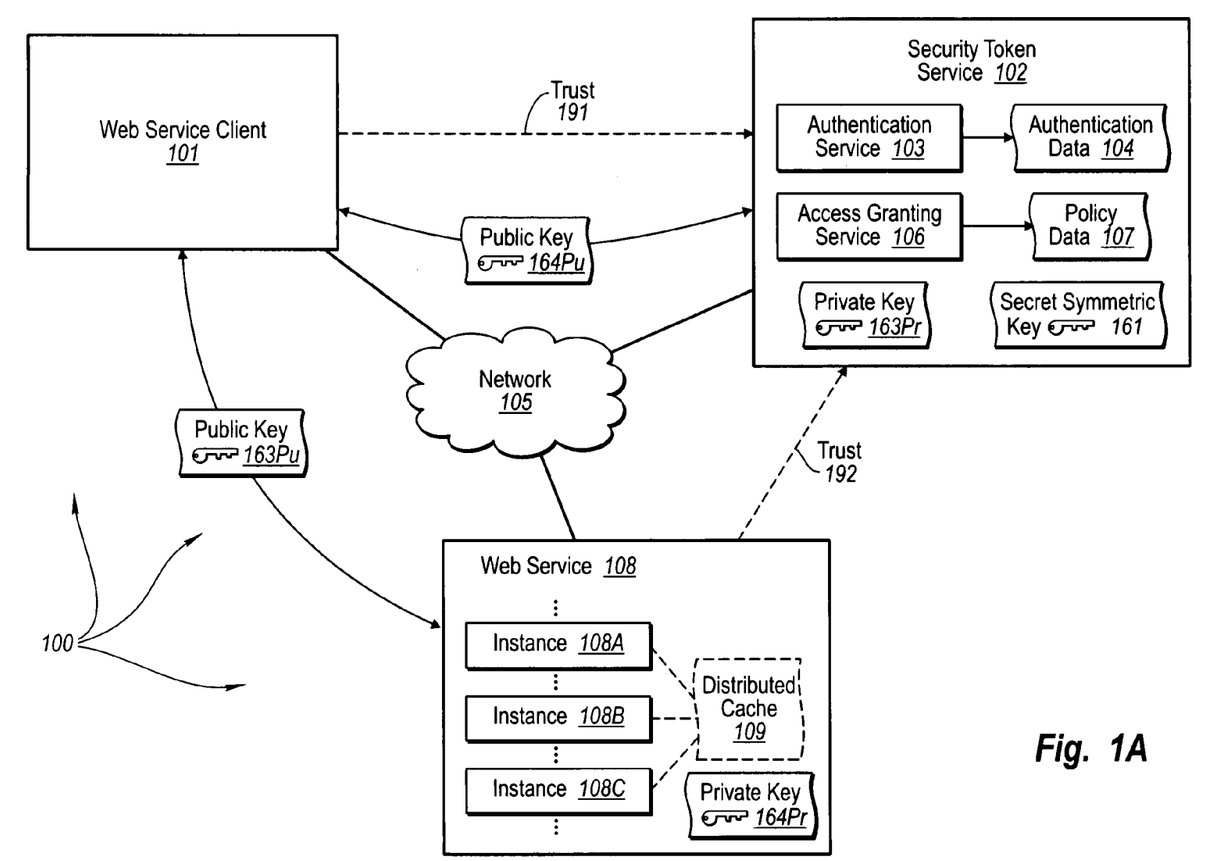
FIG. 1A illustrates an example of a computer architecture that facilitates trusted third party authentication for Web services.

FIG. 1A illustrates an example of a computer architecture 100 that facilitates trusted third party authentication for Web services. As depicted in computer architecture 100, Web service client 101, security token service 102, and Web service 108 are connected to network 105. Network 105 can be a Local Area Network ("LAN"), Wide Area Network ("WAN"), or even the Internet. Computer systems and modules connected to network 105 can receive data from and send data to other computer systems and modules connected to network 105. Accordingly, Web service client 101, security token service 102, and Web service 108, as well as other connected computer systems and modules (not shown), can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over network 105. For example, Web service client 101 and Web service 108 can create SOAP envelopes and exchange SOAP envelopes (including eXstensinle Markup Language ("XML") data) over network 105.

Within computer architecture 100, it should be understood that drawing labels including the label portion "Pu" are used to refer to public keys of public/private key pairs and that drawing labels including the label portion "Pr" are used to refer to private keys of public/private key pairs. Further, like numbered drawing labels that include the label portion Pu or Pr refer to either a public key or corresponding private key respectively of the same public/private key pair. Thus, two different public/private key pairs are depicted in computer architecture 100. One public/private key pair is depicted as public key 163Pu/private key 163Pr and another public/private key pair is depicted as public key 164Pu/private key 164Pr. Public/private key pairs can be part of a Public Key Infrastructure ("PKI").

Private key 163Pr can be a private key that corresponds to security token service 102. Thus, Web service client 101 and Web service 108 can be given access to the corresponding public key, public key 163Pu. Likewise, private key 164Pr can be a private key that corresponds to Web service 108. Thus, Web service client 101 and security token service 102 can be given access to the corresponding public key, public key 164Pu. Accordingly, security token service 102, Web service client 101, Web service 108 can utilize the public/private key pairs public key163Pu/private key 163Pr and public key 164Pu/private key 164Pr to appropriately sign data, validate signatures, encrypt data, and decrypt data.

Within computer architecture 100, it should be understood that drawing labels including the label portion "Dr" are used to refer to derived symmetric keys that have be derived from other symmetric keys. For example, referring briefly to FIG. 1B, derived client/STS session key 114Dr is derived from client/STS session key 114. Accordingly, security token service 102, Web service client 101, Web service 108 can also utilize (potentially derived) symmetric keys (e.g., session keys) to sign data, validate signatures, encrypt data, and decrypt data. Symmetric keys can be shared between components in computer architecture 100 or can remain secret to a particular component. For example, security token service 102 can maintain secret symmetric key 161.

Security token service 102 includes authentication service 103 and access granting service 106. Authentication service 103 is configured to receive authentication requests from Web service components (e.g., Web services client 101), authenticate the Web service components, and return authentication responses to the requesting Web service components. Authentication module 103 can refer to authentication data 104, such as, for example, a credentials database or certificate validation data, to authenticate a Web service component. Access granting service 106 is configured to receive access granting requests from Web service components, determine if access is to be granted to a Web service, and return access granting response to requesting Web service components. Access granting service 106 can refer to policy data 107, such as, for example, policy set by a Web services administrator, to determine if access is to be granted.

Web service client 101 can be a client portion of a distributed application. Trust 191 represents that Web service client 101 has an established trust relationship with security token service 102. That is, Web service client 101 trusts security token service 102. Trust 191 can be pre-established and/or can result from out-of-band communication. For example, trust 191 can be a symmetric key trust or an X.509 certificate trust.

Web service 108 can be a server portion of a distributed application. In some embodiments, Web service 108 is a Web service farm including multiple Web service instances, such as, for example, instances 108A, 108B, and 108C. State information for Web service clients connected to each instance 108A, 108B, and 108C can optionally be maintained in distributed cache 109 such that Web service clients can more efficiently transition between instances 108A, 108B and 108C.

Trust 192 represents that Web service 108 has an established trust relationship with security token service 102. That is, Web service 108 trusts security token service 102. Trust 192 can be pre-established and/or can result from out-of-band communication. For example, trust 192 can be a symmetric key trust or an X.509 certificate trust.

Figure 1B:
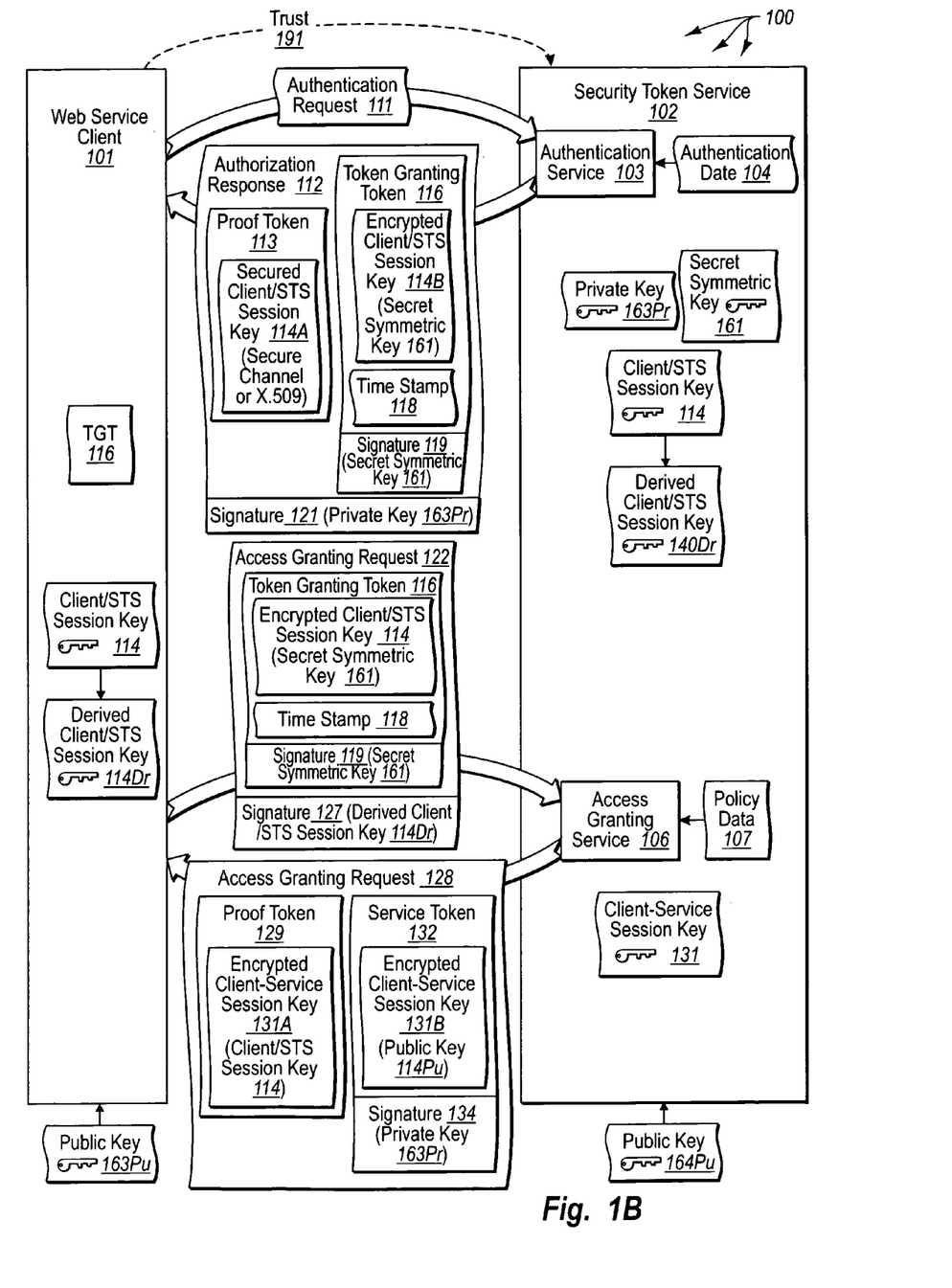
FIG. 1B illustrates an alternate depiction of a first portion of the example computer architecture in FIG. 1A.

FIG. 1B illustrates an alternate depiction of Web service client 101 and security token service 102 from computer architecture 100. FIG. 1B also depicts a number of electronic messages that are exchanged (e.g., via network 105) between Web service client 101 and security token service 102. As depicted, some of the data elements in FIG. 1B include parenthetical descriptions. For example, signature 119 includes the parenthetical description "(secret symmetric key 161)". These parenthetical descriptions are used to indicate what key was used to encrypt encrypted data or sign signed data or how data was secured.

Thus, referring back to signature 119, the parenthetical description "(secret (symmetric key 161)" indicates that secret symmetric key 161 was used to generate signature 119. Similarly, referring now to encrypted client-service session key 131B, the parenthetical description "(public key 164Pu)" indicates that public key 164Pu was used to encrypt encrypted client-service session key 131B. Referring now to secured client/STS session key 114A, the parenthetical description "(secure channel or X.509)" indicates that secured client/STS session key 114 was secured over a secure channel or using the public key in an X.509 certificate.

Figure 2:
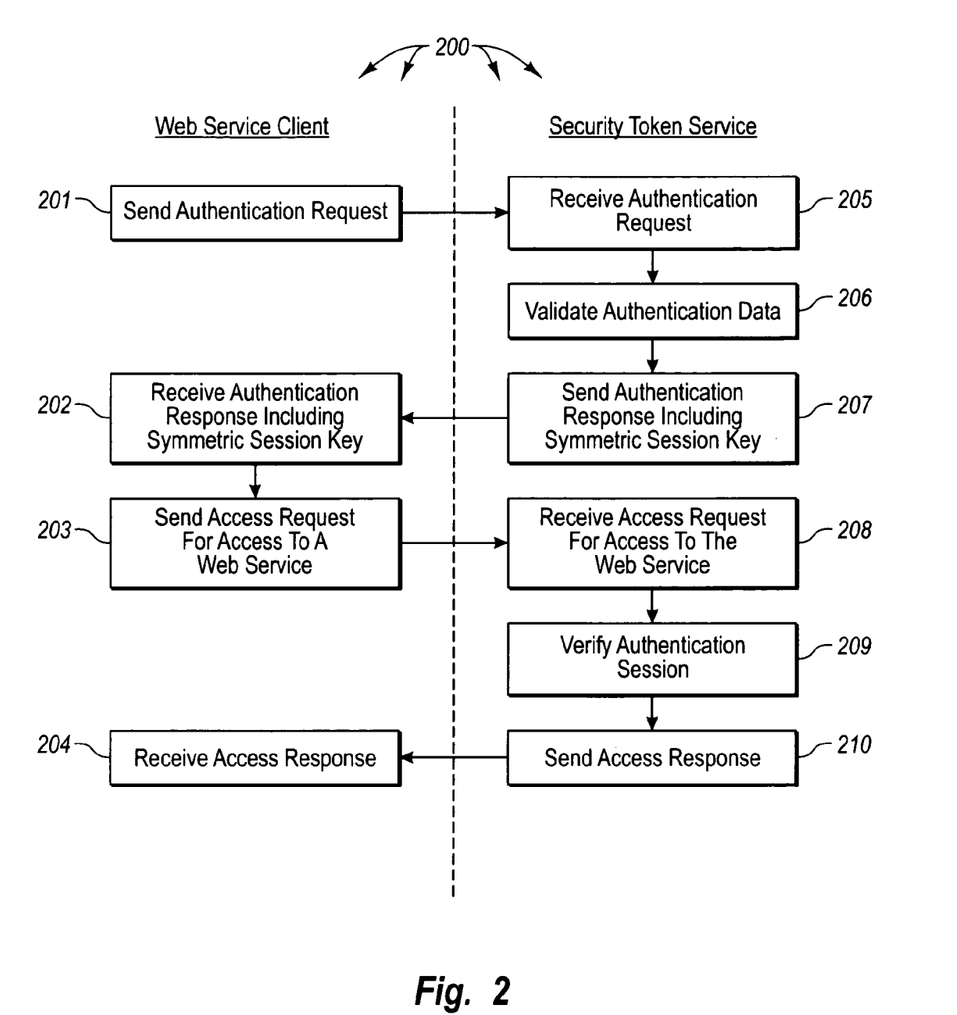
FIG. 2 illustrates an example flow chart of a method for acquiring a service token for accessing a Web service.

FIG. 2 illustrates an example flow chart of a method 200 for acquiring a service token for accessing a Web service. The method 200 will be described with respect to the components and data in FIG. 1B.

Method 200 includes an act of sending an authentication request (act 201). For example, Web service client 101 can send authentication request 111 to authentication service 103. Authentication request 111 can include a user name and password that are protected using a secure channel, such as, for example, HTTPS. Alternately, authentication request 111 can include an X.509 certificate that is signed with a private key (not shown) corresponding to Web service client 101.

Method 200 includes an act of receiving an authentication request (act 205). For example, authentication service 103 can receive authentication request 111. Method 200 includes an act of validating authentication data (act 206). For example, authentication service 103 can compare a user name and password contained in authentication request 111 to authentication data 104 (e.g., a credentials database). Alternately, authentication service 103 can refer to authentication data 104 (e.g., a PKI) to locate a public key for Web service client 101 and use the public key to validate a signature on authentication request 111.

Method 200 includes an act of sending an authentication response including a symmetric session key (act 207). For example, security token service 102 can send authentication response 112 to Web service client 101. Authentication response 112 includes proof token 113 and token granting token 116. Both proof token 113 and token granting token 116 include an instance of client/STS session key 114 (a symmetric key) that can be used to secure communications between Web service client 101 and access granting service 106. Proof token 113 includes secured client/STS session key 114A that is encrypted over a secure channel or through the public key in an X.509 certificate.

Token granting token 116 includes encrypted client/STS session key 114B that was encrypted using secret symmetric key 161. Token granting token 116 also includes time stamp 118 indicating when token granting token 116 was used. To prevent tampering, token granting token 116 also includes signature 119 that was generated using secret symmetric key 161. Alternately, a different secret symmetric key can be used to generate signature 119.

Authentication response 112 includes signature 121 that was generated using private key 163Pr (security token service 102's private key). Signature 121 indicates to a receiving component that security token service 102 created authentication response 112.

Method 200 includes an act of receiving an authentication response including the symmetric session key (act 202). For example, Web service client 101 can receive authentication response 112. Web service 101 validate signature 121 (thereby validating authentication response 112) using public key 163Pu. Web service client 101 can extract client/STS session key 114A from proof token 113 and maintain a copy of client/STS session key 114.

Web service client 101 can derive other session keys, such as, for example, derived client/STS session key 114Dr, from client/STS session key 114. Subsequently, for example when Web service client 101 is to communicate with a Web service, Web service client 101 can utilize a (potentially derived) session key to secure communication with access granting service 106. It may also be that security token service 102 derives other session keys from client/STS session key 114.

Web service client 101 and security token service 102 can utilize the same key derivation algorithms such that derived keys at Web service client 101 and security token service 102 continue to be symmetric after derivation. Thus, security token service 102 can also derive derived client/STS session key 114Dr from client/STS session key 114.

Method 200 includes an act of sending an access request for access to a Web service (act 203). For example, Web service client 101 can send access granting request 122 to access granting service 106. Access granting request 122 includes token granting token 116. Access granting request 122 includes signature 127 that was generated using derived client/STS session key 114Dr. Signature 122 indicates that access granting request 122 is included in an authentication session between Web service client 101 and security token service 102.

Method 200 includes an act of receiving the access request for access to the Web service (act 208). For example, access granting service 106 can receive access granting request 122 from Web service client 101. Method 200 includes an act of verifying an authentication session (act 209). For example, access granting service 106 can verify that Web service client 101 has an authenticated session to security token service 102. Subsequent to receipt of access granting request 122, access granting service 106 can validate signature 127 (thereby validating access granting request 122) using derived client/STS session key 114Dr.

Access granting service 106 can then validate signature 119 (thereby validating token granting token 116) using secret symmetric key 161. Access granting service 106 can also decrypt encrypted client/STS session key 114B using secret symmetric key 116 to reveal client/STS session key 114. Based on token granting token 116 containing an instance of client/STS session key 114, access granting service determines that Web service client 101 has an authenticated session to security token service 102.

Method 200 includes an act of sending an access response (act 211). For example, access granting service 106 can send access granting response 128 to Web service client 101. Access granting response 128 includes proof token 129 and service token 132. Both proof token 128 and service token 132 include an instance of client-service session key 131 (a symmetric key) that can be used to secure communications between Web service client 101 and Web service 108. Proof token 129 includes encrypted client-service session key 131A that is encrypted using client/STS session key 114 (or a derivative thereof). Thus, Web service client 101 can decrypt encrypted client-service session key 131A (using client/STS session key 114 or the derivative thereof) to reveal client-service session key 131.

Service token 132 includes encrypted client-service session key 131B that was encrypted using public key 164Pu (the public key for Web service 108). To indicate that service token 132 is from security token service 102, service token 132 includes signature 134 that was generated using private key 163Pr (the private key for security token service 102). Thus, Web service 108 can validate signature 134 using public key 163Pu (the corresponding public key for security token service 102) to verify that service token 132 was sent from security token service 102. Web service 108 can also decrypt encrypted client-service session key 131B using private key 164Pr (the corresponding private key for Web service 108).

Accordingly, a client-service session key can be transferred to both a client and service in a secure manner.

Method 200 includes an act of receiving an access response (act 204). For example, Web service client 101 can receive access granting response 128. From proof token 129, Web service client can decrypt encrypted client-service session key 131A (Using client/STS session key 114 or a derivative thereof) to reveal client-service session key 131. Web service client 101 can store client-service session key 131 to facilitate subsequent communication with Web service 108. Web service client 101 can also store service token 132 for subsequent transfer to Web service 108.

Figure 1C:
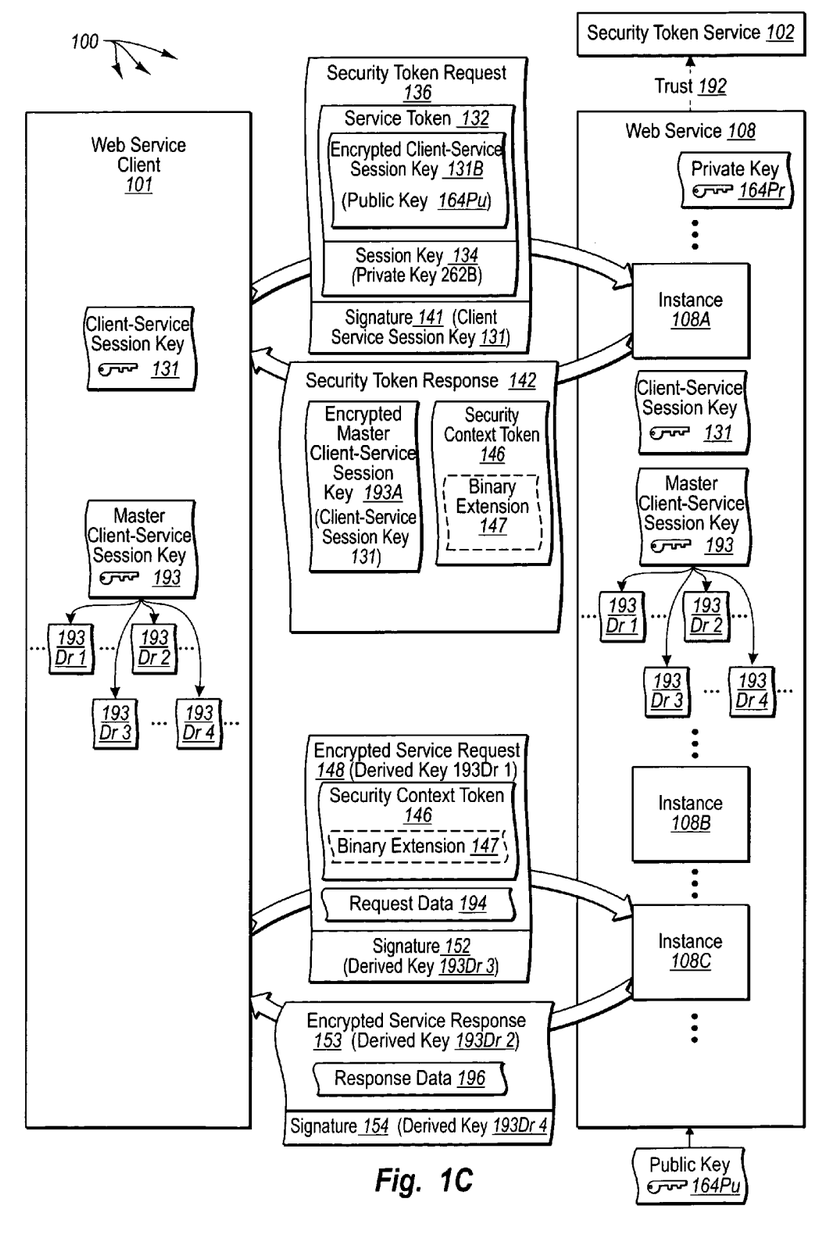
FIG. 1C illustrates an alternate depiction of a second portion of the example computer architecture in FIG. 1A.
Figure 3:
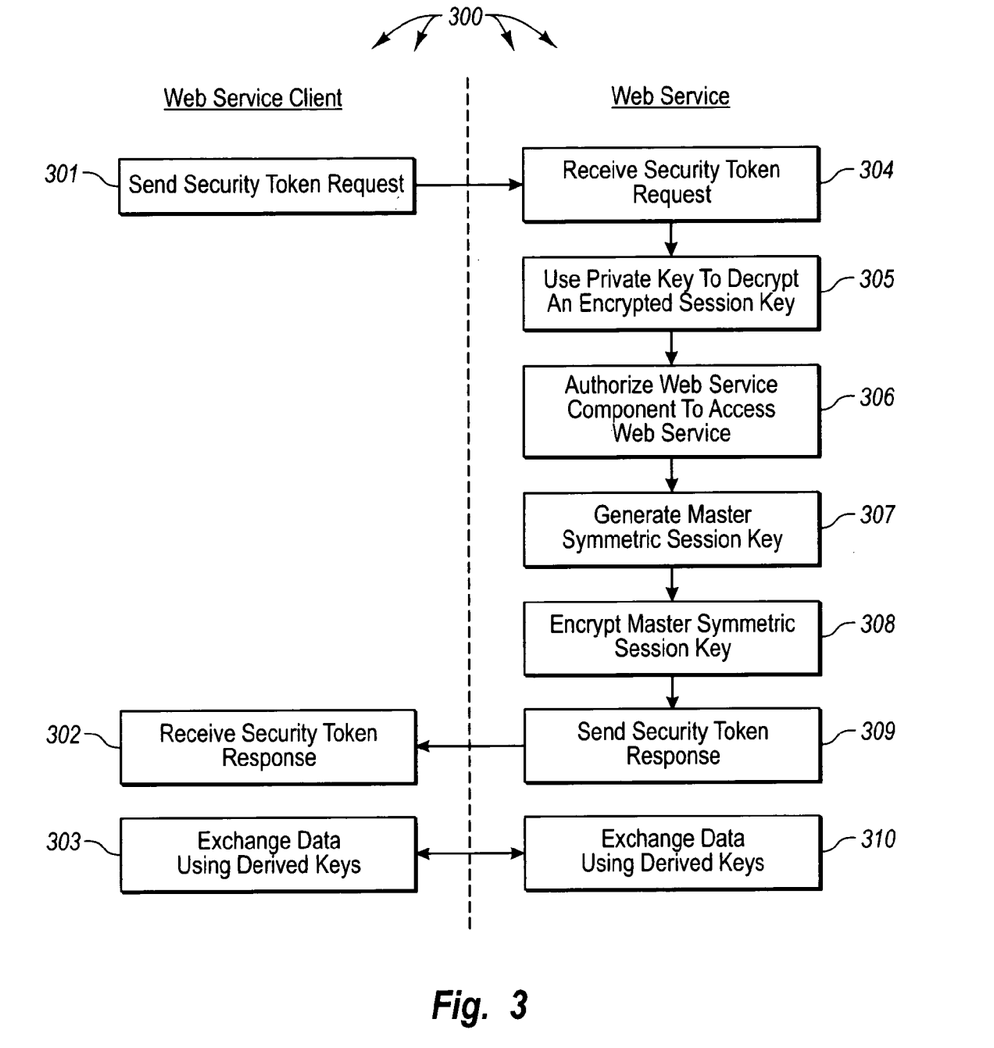
FIG. 3 illustrates an example flow chart of a method for securing communication between a Web services component and a Web service.

FIG. 1C illustrates an alternate depiction of Web service client 101, security token service 102 and Web service 108 from computer architecture 100. FIG. 1B also depicts a number of electronic messages that are exchanged (e.g., via network 105) between Web service client 101 and Web service 108. FIG. 3 illustrates an example flow chart of a method 300 for securing communication between a Web services component and a Web service. Method 300 will be described with respect to the components and data in FIG. 1C.

Method 300 includes an act of sending a security token request (act 301). For example, Web service client 101 can send security token request 136 to instance 108A of Web service 108. Security token request 136 includes service token 132 (issued from security token service 102). Security token request 136 includes signature 141 that was a generated using client-service session key 131. Security token request 136 can also include identity information corresponding to Web service 101.

Method 300 includes an act of receiving the security token request (act 304). For example, instance 108A can receive security token request 136 from Web service client 101. Method 300 includes an act of using a private key to decrypt an encrypted session key (act 305). For example, instance 108A can decrypt encrypted client-service session key 131B using private key 164Pr to reveal client-service session key 131. Instance 108A can also validate signature 134 using public key 163Pu to verify that that service token 132 was sent from security token service 102. Subsequently, instance 108A can validate signature 141 using (the previously revealed) client-service session key 131.

Method 300 includes an act of authorizing the Web service component to access the Web service (act 306). For example, Web service 108 (based on specified policies) can authorize Web service client 101 to access Web service 108. Method 300 includes an act of generating a master symmetric session key (act 307). For example, Web service 108 can generate master client-service session key 193 for securing communication between Web service client 101 and instances of Web service 108.

Method 300 includes an act of encrypting the master symmetric session key (act 308). For example, instance 108A can encrypt master client-server session key 193 using client-service session key 131 to generate encrypted master client-server session key 193A. Instance 108A can include encrypted master client-server session key 193A along with security context token 146 in security token response 142. Security token context contains security context data for secure communication between Web service client 101 and instances of Web service 108.

In some embodiments, security context token 146 includes optional binary extension 147. Web service instances that receive binary extension 147 can use data contained in binary extension 147 to reconstruct security states without having to refer to a service-side distributed cache. Accordingly, in embodiments that utilize binary extension 147, Web services are relieved from having to maintain a service-side distributed cache. Further, representing security context information in a binary format facilitates security context token processing without having to perform, potentially resource intensive, XML canonicalization.

Method 300 includes an act of sending a security token response (act 309). For example, instance 108A can send security token response 142 to Web service client 101. Method 300 includes an act of receiving the security token response. For example, Web service client 101 can receive security token response 142 from instance 108A. Web service client 101 can decrypt encrypted master client-server session key 193A using client-service session key 131 to reveal master client-server session key 193. Accordingly, subsequent communication between Web service client 101 and instances of Web service 108 can be secured using master client-service session key or derivatives thereof.

In accordance with a common key derivation algorithm, both Web service client 101 and Web service 108 can derive additional symmetric session keys, such as, for example, master client-server session keys 193Dr1, 193Dr2, 193Dr3, and 193Dr4, from master client-server session key 193. Web service client 101 and Web service 108 can then use the derived keys for securing communication between one another.

Method 300 includes acts of exchanging data using derived keys (act 303 and act 310). For example, Web service client 101 can use derived key 193Dr1 to generate encrypted service request 148. Encrypted service request 148 includes security context token 146 and request data 194. Encrypted service request 148 also includes signature 152 that was generated using derived key 193Dr3.

Instance 108C can receive encrypted service request 148. Instance 108C can use derived key 193Dr1 to decrypt encrypted service request 148 revealing security context token 146 and request data 194. Instance 108C can also validate signature 152 using derived key 193Dr3 to verify that encrypted service request 148 is part of a secure communication between Web service client 1010 and Web service 108. Instance 108C can process security context token 146 and request data 104 to determine how to respond to Web service client 101.

Instance 108C can use derived key 193Dr2 to generate encrypted service response 153. Encrypted service response 153 includes response data 196 that is responsive to request data 194. Encrypted service response 153 also includes signature 154 that was generated using derived key 193Dr4.

Web service client 101 can receive encrypted service response 153. Web service client 101 can use derived key 193Dr2 to decrypt encrypted service response 153 revealing response data 196. Web service 101 can also validate signature 154 using derived key 193Dr4 to verify that encrypted service response 153 is part of a secure communication between Web service client 101 and Web service 108.

Thus, embodiments of the present invention can initially use public/private key pairs (e.g., public key 163Pu/ private key 163Pr and public key 163Pu/ private key 163Pr) for secure communication taking advantage of existing key infrastructures, such as, for example, PKI. A subsequent transition to using symmetric session keys (e.g., master client-service session key 193 and derivatives thereof) for secure communication can be made. Accordingly, embodiments of the present invention can leverage the key management features of existing public key infrastructures and then subsequently transition to symmetric keys for efficiency.

Token granting tokens (e.g., token granting token 116) and service tokens (e.g., service token 132) can be expressed as custom XML tokens. The following XML instructions are example description of a custom XML token in accordance with the principles of the present invention:

```
1.    <contoso:IdentityTokenEx contoso:TokenId=... contoso:MajorVersion=...
      contoso:MinorVersion=... contoso:Issuer=... contoso:IssueTime=... contoso:Purpose=...>
2.      <contoso:Conditions NotBefore="..." NotOnOrAfter="..." />
3.      <wsp:AppliesTo>
4.         <wsa:EndpointReference>
5.            <wsa:Address>...</wsa:Address>
6.         </wsa:EndpointReference>
7.      </wsp:AppliesTo>
8.      <contoso:TokenStatement contoso:AuthenticationMechanism=...
         contoso:AuthenticationTime=... />
9.         <contoso:SubjectName>...</contoso:SubjectName>
10.        <ds:KeyInfo>
11.           <xenc:EncryptedKey Id=... >
12.              <xenc:EncryptionMethod Algorithm=... />
13.              <ds:KeyInfo >
14.                 <wsse:SecurityTokenReference>
15.                    <wsse:KeyIdentifier ValueType=... EncodingType=... >
16.                       ...
17.                    </wsse:KeyIdentifier>
18.                 </wsse:SecurityTokenReference>
19.              </ds:KeyInfo>
20.              <xenc:CipherData>
21.                 <xenc:CipherValue>
22.                    ...
23.                 </xenc:CipherValue>
24.              </xenc:CipherData>
25.           </xenc:EncryptedKey>
26.        </ds:KeyInfo>
27.     </contoso:TokenStatement>
28.     <ds:Signature>
29.        <ds:SignedInfo>
30.           <ds:CanonicalizationMethod
                  Algorithm='http://www.w3.org/2001/10/xml-exc-c14n#' />
31.           <ds:SignatureMethod Algorithm=... />
32.           <ds:Reference URI=... >
33.              <ds:Transforms>
34.                 <ds:Transform
                       Algorithm='http://www.w3.org/2000/09/xmldsig#enveloped_signature' />
35.                 <ds:Transform Algorithm='http://www.w3.org/2001/10/xml-exc-c14n#' />
36.              </ds:Transforms>
37.              <ds:DigestMethod Algorithm=... />
38.              <ds:DigestValue>...</ds:DigestValue>
39.           </ds:Reference>
40.        </ds:SignedInfo>
41.        <ds:SignatureValue>...</ds:SignatureValue>
42.        <ds:KeyInfo>
```

-continued

```
43.         <wsse:SecurityTokenReference>
44.           <wsse:KeyIdentifier ValueType=... EncodingType=... >...
45.           </wsse:KeyIdentifier>
46.         </wsse:SecurityTokenReference>
47.       </ds:KeyInfo>
48.     </ds:Signature>
49. </contoso:IdentityTokenEx>
```

At line 1, the IdentityTokenEx\@TokenId attribute identifies the security token using a URI. The data type is xsd:ID. Each security token URI can be unique to both the sender and recipient. URI values value be globally unique in time and space. Also at line 1, the IdentityTokenEx\@MajorVersion attribute identifies the major version of this custom token and the IdentityTokenEx\@MinorVersion attribute identifies the minor version of this custom token. Also at line 1, the IdentityTokenEx\@Issuer attribute identifies the issuer of this token using a URI. Also at line 1, the IdentityTokenEx\@IssueTime attribute represents the time (e.g, UTC format) the token is issued. The XML schema for this value is xsd:dateTime.

Also at line 1, the IdentityTokenEx\@Purpose attribute identifies the purpose of this custom token, using a QName. Values can include:

| QName | Description |
|---|---|
| contoso:TokenGrantingToken | Token that is used by an access granting service to grant other service token. |
| contoso:ServiceToken | Token that is used to access an application Web service. |

At line 2, the IdentityTokenEx\contoso:Conditions element specifies the conditions under which this token is valid. Also at line 2, the IdentityTokenEx\Conditions\@NotBefore attribute specifies the earliest time (e.g., UTC format) which this token becomes valid. The schema for this value is xsd:dateTime. Also at line 2, the IdentityToken\ExConditions\@NotOnOrAfter attribute specifies the earliest time (e.g., UTC format) which this token becomes invalid. The schema for this value is xsd:dateTime.

At lines 3-7, the IdentityTokenExwsp:AppliesTo element specifies the endpoint for which this token is valid. At lines 4-6, the IdentityTokenEx\AppliesTo\wsa:EndpointReference element contains a reference to an endpoint for which the token is valid. At line 5, the IdentityTokenEx\AppliesTo\EndpointReference\wsa:Address element specifies the URI of the endpoint.

At lines 8-27, the IdentityTokenEx\TokenStatement element contains authentication and identity information related to the authenticated session. Also at line 8, the IdentityTokenEx\TokenStatement\@AuthenticationMechanism attribute identifies the authentication mechanism that is used to authenticate the subject, using a QName. Values can include:

| QName | Description |
|---|---|
| contoso:password | A username and password is used to authenticate the subject. |
| contoso:x509certificate | An X509 certificate is used to authenticate the subject. |

Also at line 8, the IdentityTokenEx\TokenStatement\@AuthenticationTime element identifies the time (e.g., UTC format) when the authentication take place. The XML schema for this value is xsd:dateTime.

At line 9, the IdentityTokenEx\TokenStatement\SubjectName element identifies the party that has been authenticated. At lines 10-26, the IdentityTokenEx\TokenStatement\ds:KeyInf element contains a session key that is exchanged through this token. At lines 11-25, the IdentityTokenEx\TokenStatement\KeyInfo\xenc:EncryptedKey element contains an encrypted session key. At lines 28-48, the IdentityToken\Exds:Signature element contains an enveloped signature over the custom XML token.

In some embodiments, Web service components and Web services can exchange extended security context tokens (e.g., security context token 146). The following XML instructions are example description of an extended security context token in accordance with the principles of the present invention:

```
60. <wst:SecurityContextToken wsu:Id=... >
61.   <wsu:Identifier>...</wsu:Identifier>
62.   <contoso:SctExtension>
63.   MIIEZzCCA9CgAwIBAgIQEmtJZc0...
64.   </contoso:SctExtension>
65. </wst:SecurityContextToken>
```

At lines 62-64, the SecurityContextToken\contoso:SctExtension element contains the SCT custom extensions encoded in base64 binary format.

XML instructions describing token granting tokens, service tokens, and extended security context tokens can be included in SOAP messages, such as, for example authentication response 112, access granting response 128, and security token response 142 that are exchanged between components of computer architecture 100.

Figure 4:
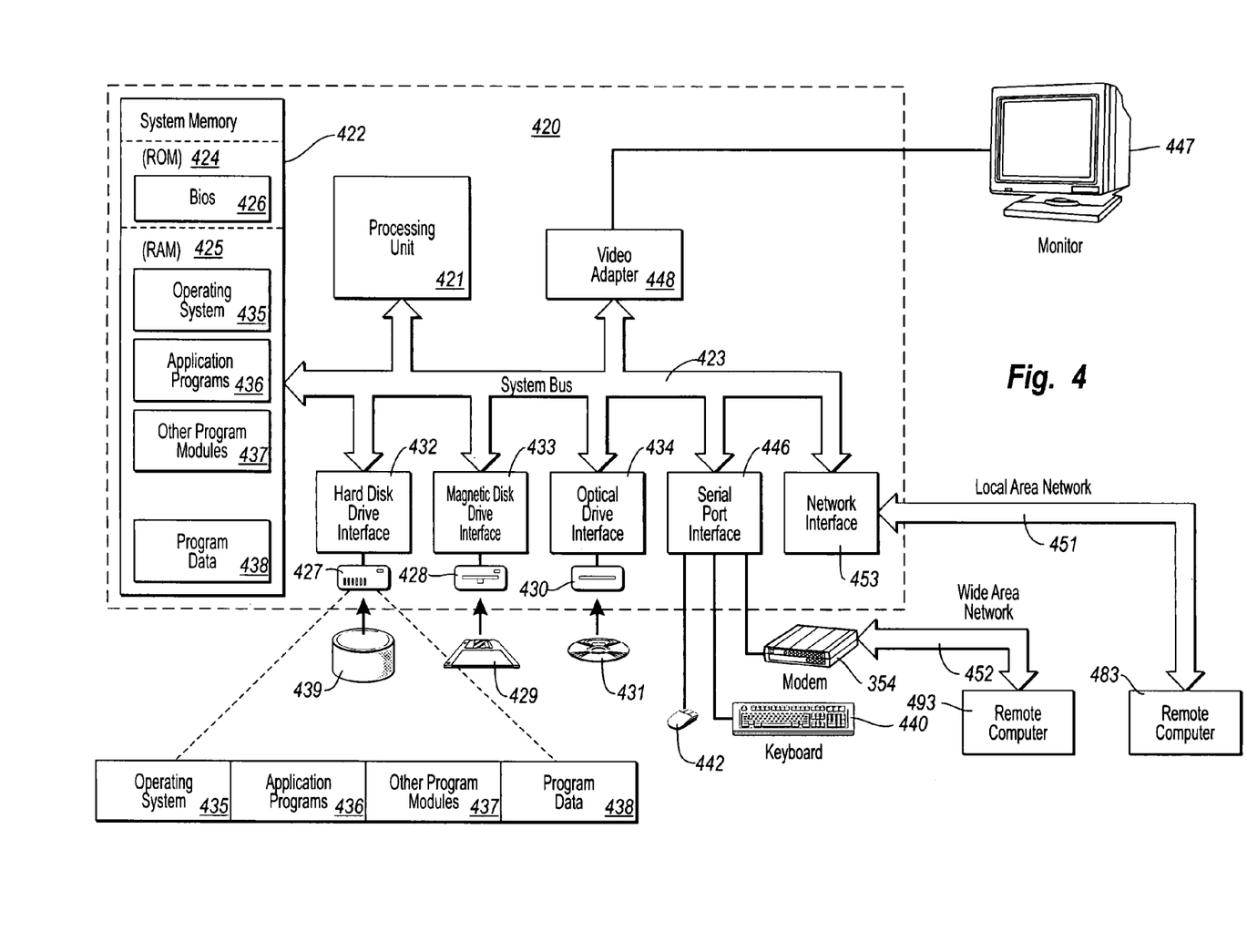
FIG. 4 illustrates a suitable operating environment for the principles of the present invention.

FIG. 4 illustrates a suitable operating environment for the principles of the present invention. FIG. 4 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 4, an example system for implementing the invention includes a general-purpose computing device in the form of computer system 420, including a processing unit 421, a system memory 422, and a system bus 423 that couples various system components including the system memory 422 to the processing unit 421. Processing unit 421 can execute computer-executable instructions designed to implement features of computer system 420, including features of the present invention. The system bus 423 may be any of several types of bus structures including a memory bus or memory controller, a peripheral bus, and a local bus using any of a variety of bus architectures. The system memory includes read only memory ("ROM") 424 and random access memory ("RAM") 425. A basic input/output system ("BIOS") 426, containing the basic routines that help transfer information between elements within computer, system 420, such as during start-up, may be stored in ROM 424.

The computer system 420 may also include magnetic hard disk drive 427 for reading from and writing to magnetic hard disk 439, magnetic disk drive 428 for reading from or writing to removable magnetic disk 429, and optical disk drive 430 for reading from or writing to removable optical disk 431, such as, or example, a CD-ROM or other optical media. The magnetic hard disk drive 427, magnetic disk drive 428, and optical disk drive 430 are connected to the system bus 423 by hard disk drive interface 432, magnetic disk drive-interface 433, and optical drive interface 434, respectively. The drives and their associated computer-readable media provide non-volatile storage of computer-executable instructions, data structures, program modules, and other data for the computer system 420. Although the example environment described herein employs magnetic hard disk 439, removable magnetic disk 429 and removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 439, magnetic disk 429, optical disk 431, ROM 424 or RAM 425, including an operating system 435, one or more application programs 436, other program modules 437, and program data 438. A user may enter commands and information into computer system 420 through keyboard 440, pointing device 442, or other input devices (not shown), such as, for example, a microphone, joy stick, game pad, scanner, or the like. These and other input devices can be connected to the processing unit 421 through input/output interface 446 coupled to system bus 423. Input/output interface 446 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 447 or other display device is also connected to system bus 423 via video interface 448. Other peripheral output devices (not shown), such as, for example, speakers and printers, can also be connected to computer system 420.

Computer system 420 is connectable to networks, such as, for example, an office-wide or enterprise-wide computer network, a home network, an intranet, and/or the Internet. Computer system 420 can exchange data with external sources, such as, for example, remote computer systems, remote applications, and/or remote databases over such networks.

Computer system 420 includes network interface 453, through which computer system 420 receives data from external sources and/or transmits data to external sources. As depicted in FIG. 4, network interface 453 facilitates the exchange of data with remote computer system 483 via link 451. Network interface 453 can logically represent one or more software and/or hardware modules, such as, for example, a network interface card and corresponding Network Driver Interface Specification ("NDIS") stack. Link 451 represents a portion of a network (e.g., an Ethernet segment), and remote computer system 483 represents a node of the network.

Likewise, computer system 420 includes input/output interface 446, through which computer system 420 receives data from external sources and/or transmits data to external sources. Input/output interface 446 is coupled to modem 454 (e.g., a standard modem, a cable modem, or digital subscriber line ("DSL") modem) via link 459, through which computer system 420 receives data from and/or transmits data to external sources. As depicted in FIG. 4, input/output interface 446 and modem 454 facilitate the exchange of data with remote computer system 493 via link 452. Link 452 represents a portion of a network and remote computer system 493 represents a node of the network.

While FIG. 4 represents a suitable operating environment for the present invention, the principles of the present invention may be employed in any system that is capable of, with suitable modification if necessary, implementing the principles of the present invention. The environment illustrated in FIG. 4 is illustrative only and by no means represents even a small portion of the wide variety of environments in which the principles of the present invention may be implemented.

In accordance with the present invention, modules including security token services, authentication services, access granting services, Web service clients, Web services, and Web service instances as well as associated data, including, authentication data, policy data, proof tokens, token granting tokens, service tokens, security context tokens, binary extensions, symmetric keys, public keys, private keys, and derived keys can be stored and accessed from any of the computer-readable media associated with computer system 420. For example, portions of such modules and portions of associated program data may be included in operating system 435, application programs 436, program modules 437 and/or program data 438, for storage in system memory 422.

When a mass storage device, such as, for example, magnetic hard disk 439, is coupled to computer system 420, such modules and associated program data may also be stored in the mass storage device. In a networked environment, program modules depicted relative to computer system 420, or portions thereof, can be stored in remote memory storage devices, such as, system memory and/or mass storage devices associated with remote computer system 483 and/or remote computer system 493. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired secured by United States Letters Patent is:

1. At a computer system, a method of authenticating a Web services client, the method comprising:
an act of sending an authentication request to an authentication service;

an act of receiving an authentication response from the authentication service, the authentication response including two instances of a first symmetric session key for securing communication between the Web services client and an access granting service, the first instance of the first symmetric session key secured for delivery to the Web services client and included in a first proof token, the second instance of the first symmetric session key encrypted with a secret symmetric key of the security token service and included in a token granting token, the token granting token being signed with a digital signature using the secret symmetric key, the authentication response also being signed with a digital signature using the authentication service's private key;

an act of sending an access request for access to an instance of a Web service in a Web service farm to the access granting service, the access request including the token granting token;

an act of receiving an access granting response from the access granting service, the access granting response including two instances of a second symmetric session key for securing communication between the Web services client and the Web service, the first instance of the second symmetric session key being encrypted with the first symmetric session key and included in a second proof token, the second instance of the second symmetric session key being encrypted with a public key from a public/private key pair corresponding to the Web service and included in a service token;

an act of sending a security token request to a first instance of the Web service, the security token request including identity information for the Web services client and the service token;

an act of receiving a security token response from the first instance of the Web service, the security token response including a security context token and a master symmetric session key for securing communication between the Web services client and the Web service, the security context token including a binary extension such that any instance of the Web service in the Web service farm can recreate security session state for the Web services client from the binary extension without referring to a distributed service-side cache;

an act of deriving a first and second derived symmetric session keys from the master symmetric session key, wherein the first and second derived symmetric session keys are derived by the Web services client using a common key derivation algorithm;

an act of sending a service request to the first instance of the Web service, the service request encrypted using the first derived symmetric session key and signed using a second derived symmetric session key;

an act of receiving a service response from the first instance of the Web service, the service response encrypted using a third derived symmetric session key, the service response signed with a digital signature using a fourth derived symmetric session key, wherein the third and fourth derived symmetric session keys were derived by the first instance of the Web service from the master symmetric session key using the common key derivation algorithm;

an act of deriving the third and fourth derived symmetric session keys from the master symmetric session key, wherein the third and fourth derived symmetric session keys are derived by the Web services client using the common key derivation algorithm;

an act of using the third derived symmetric session key to decrypt the service response;

an act of using the fourth derived symmetric session key to validate the digital signature;

an act of sending the security context token including the binary extension to a second instance of the Web service such that the second instance of the Web service recreates the security session state for the Web services client from the binary extension without referring to a distributed service-side cache; and an act of sending a service request to the second instance of the Web service using symmetric session keys that are derived from the master symmetric session key that was received from the first instance of the Web service such that the Web services client may communicate with the second instance of the Web service without first having to request a security token from the second instance of the Web service.

2. The method as recited in claim 1, wherein the act of sending an authentication request to an authentication service comprises an act of sending a username and password to the authentication service.

3. The method as recited in claim 1, wherein the act of sending an authentication request to an authentication service comprises an act of sending a digitally signed X.509 certificate to the authentication service.

4. The method as recited in claim 1, wherein the act of receiving an authentication response from the authentication service comprises an act of receiving a SOAP message that includes a custom XML token granting token.

5. The method as recited in claim 1, wherein the act of receiving an access granting response from the access granting service comprises an act of receiving a SOAP message that includes a custom XML service token.

6. In a computing environment including a security token service and a Web service, a method of authenticating a Web services client to access the Web service, the method comprising:

an act, at the security token service, of receiving an authentication request from a Web services client;

an act, at the security token service, of validating authentication data contained in the authentication request;

an act, at the security token service, of sending an authentication response to the Web services client, the authentication response including two instances of a symmetric session key for securing communication between the Web services client and an access granting service of the security token service, the first instance of the symmetric session key secured for delivery to the Web services client and included in a first proof token, the second instance of the symmetric session key encrypted with a secret symmetric key of the security token service and included in a token granting token, the token granting token being signed with a digital signature using the secret symmetric key, the authentication response also being signed with a digital signature using the security token service's private key;

an act, at the security token service, of receiving an access request for access to an instance of a Web service in a Web service farm from the Web services client, the access request including the token granting token;

an act, at the security token service, of verifying that the Web services client has an authenticated session to the security token service based on the contents of the token granting token; and an act, at the security token service, of sending an access granting response to the Web services client, the access granting response including two instances of a second symmetric session key for securing communication between the Web services client and the Web service, the first instance of the second symmetric session key being encrypted with the first symmetric session key and including in a second proof token, the second instance of the second symmetric session key being encrypted with a public key from a public/private key pair corresponding to the Web service and included in a service token;

an act, at a first instance of the Web service, of receiving a security token request from a Web services client, the request including a service token that was issued from a security token service, the service token including identity information for the Web services client and an encrypted symmetric session key for securing communication between the Web services client and the first instance of the Web service, the encrypted symmetric session key being encrypted using the public key from a public/private key pair corresponding to the Web service, an act, at the first instance of the Web service, of decrypting the encrypted symmetric session key with the private key from the public/private key pair;

an act, at the first instance of the Web service, of authorizing the Web services client to access the first instance of the Web service based on the contents of the service token;

an act, at the first instance of the Web service, of generating a master symmetric session key for securing communication between the Web services client and instances of the Web service;

an act, at the first instance of the Web service, of encrypting the master symmetric session key using the symmetric session key to generate an encrypted master symmetric session key;

an act, at the first instance of the Web service, of including the encrypted master symmetric session key along with a security context token in a security token response, the security context token including a binary extension such that any instance of the Web service in the Web service farm can recreate security session state for the Web services client from the binary extension without referring to a distributed service-side cache;

an act, at the first instance of the Web service, of sending the security token response to the Web services client such that communication between the Web services client and the first instance of the Web service can be secured using derived symmetric session keys derived from the master symmetric session key;

an act, at the first instance of the Web service, of receiving a service request from the Web services client, the service request encrypted using a first derived symmetric session key derived by the Web services client from the master symmetric session key and signed with a digital signature using a second derived symmetric session key derived by the Web services client from the master symmetric session key, wherein the first and second derived symmetric session keys are derived by the Web services client using a common key derivation algorithm;

an act, at the first instance of the Web service, of decrypting the service request using the first derived symmetric session key and validating the digital signature using the second derived symmetric session key, wherein the first instance of the Web service derives the first and second symmetric session key independently of the Web services client and using the same common key derivation algorithm;

an act, at a second instance of the Web service, of receiving the security context token including the binary extension from the Web services client;

an act, at the second instance of the Web service, of recreating the security session state for the Web services client from the binar extension without referring to a distributed service-side cache; and an act, at the second instance of the Web service, of receiving a service request from the Web services client using symmetric session keys that are derived from the master symmetric session key that was received by the Web services client from the first instance of the Web service such that the second instance of the Web service authorizes communication with the Web services client without the Web services client first requesting a security token from the second instance of the Web service.

7. The method as recited in claim 6, wherein the act of receiving an authentication request from a Web services client comprises an act of receiving a user name and password from the Web services client.

8. The method as recited in claim 6, wherein the act of receiving an authentication request from a Web services client comprises an act of receiving a signed X.509 certificate from the Web services client.

9. The method as recited in claim 6, wherein the act of sending an authentication response to the Web services client comprises an act of sending a SOAP message that includes a custom XML token granting token.

10. The method as recited in claim 6, wherein the act of sending an access granting response to the Web services client comprises an act of sending a SOAP message that includes a custom XML service token.

11. At a computer system including a Web service farm comprising a plurality of instances of a Web service, a method of granting access to the Web service, the method comprising:

an act, at a first instance of a Web service, of receiving a security token request from a Web services client, the request including a service token that was issued from a security token service, the service token including identity information for the Web services client and an encrypted symmetric session key for securing communication between the Web services client and an instance of the Web service in the Web service farm, the encrypted symmetric session key being encrypted using the public key from a public/private key pair corresponding to the Web service, an act, at the first instance of a Web service, of decrypting the encrypted symmetric session key with the private key from the public/private key pair;

an act, at the first instance of a Web service, of authorizing the Web services client to access the first instance of the Web service based on the contents of the service token;

an act, at the first instance of a Web service, of generating a master symmetric session key for securing communication between the Web services client and the Web service;

an act, at the first instance of a Web service, of encrypting the master symmetric session key using the symmetric session key to generate an encrypted master symmetric session key;

an act, at the first instance of a Web service, of including the encrypted master symmetric session key along with a security context token in a security token response, the security context token including a binary extension such that any instance of the Web service in the Web service farm can recreate security session state for the Web services client from the binary extension without referring to a distributed service-side cache;

an act, at the first instance of a Web service, of sending the security token response to the Web services client such that communication between the Web services client and the first instance of the Web service can be secured using derived symmetric session keys derived from the master symmetric session key;

an act, at the first instance of a Web service, of receiving a service request from the Web services client, the service request encrypted using a first derived symmetric session key derived by the Web services client from the master symmetric session key and signed with a digital signature using a second derived symmetric session key derived by the Web services client from the master symmetric session key, wherein the first and second derived symmetric session keys are derived by the Web services client using a common key derivation algorithm;

an act of the first instance of the Web service decrypting the service request using the first derived symmetric session key and validating the digital signature using the second derived symmetric session key, wherein the first instance of the Web service derives the first and second symmetric session key independently of the Web services client and using the common key derivation algorithm;

an act, at a second instance of the Web service, of receiving the security context token including the binary extension from the Web services client;

an act, at the second instance of the Web service, of recreating the security session state for the Web services client from the binary extension without referring to a distributed service-side cache; and an act, at the second instance of the Web service, of receiving a service request from the Web services client using symmetric session keys that are derived from the master symmetric session key that was received by the Web services client from the first instance of the Web service such that the second instance of the Web service authorizes communication with the Web services client without the Web services client first requesting a security token from the second instance of the Web service.

12. The method as recited in claim 11, wherein the act of receiving a security token request comprises an act of receiving a SOAP message that includes a custom XML service token issued from a trusted third party.

13. The method as recited in claim 11, further comprising:
an act of an instance of the Web service receiving a Web service request from the Web services client, the Web service request including the extended security context token; and
an act of the instance using the extended security context token to recreate security session state for the Web services client without referring to a distributed service-side cache.

14. The method as recited in claim 11, wherein the an act of sending the security token response to the Web services client comprises an act of sending a SOAP message that includes an extended security context token.

15. The method as recited in claim 11, further comprising:
an act of including response data to return to the Web services client in a service response; and
an act of sending the service response to the Web services client, the service response encrypted using a third derived symmetric session key derived from the master symmetric session key and signed with a digital signature using a fourth derived symmetric session key derived from the master symmetric session key.

* * * * *